US009470310B2

(12) United States Patent
Kinoshita

(10) Patent No.: US 9,470,310 B2
(45) Date of Patent: Oct. 18, 2016

(54) ABNORMALITY DETECTION DEVICE FOR CONTINUOUSLY VARIABLE TRANSMISSION AND METHOD OF DETECTING ABNORMALITY OF THE CONTINUOUSLY VARIABLE TRANSMISSION

(71) Applicant: Fuji Jukogyo Kabushiki Kaisha, Tokyo (JP)

(72) Inventor: Takahiro Kinoshita, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 103 days.

(21) Appl. No.: 14/593,878

(22) Filed: Jan. 9, 2015

(65) Prior Publication Data
US 2015/0204441 A1 Jul. 23, 2015

(30) Foreign Application Priority Data
Jan. 23, 2014 (JP) .................................. 2014-010020

(51) Int. Cl.
| F16H 61/12 | (2010.01) |
| F16H 61/18 | (2006.01) |
| F16H 61/66 | (2006.01) |
| F16H 61/662 | (2006.01) |
| F16H 59/48 | (2006.01) |
| F16H 59/70 | (2006.01) |

(52) U.S. Cl.
CPC .............. *F16H 61/12* (2013.01); *F16H 61/18* (2013.01); *F16H 61/66* (2013.01); *F16H 61/66259* (2013.01); *F16H 59/48* (2013.01); *F16H 2059/704* (2013.01); *F16H 2061/1208* (2013.01); *F16H 2061/1268* (2013.01); *F16H 2061/6611* (2013.01)

(58) Field of Classification Search
None
See application file for complete search history.

(56) References Cited

U.S. PATENT DOCUMENTS

| 7,379,801 B2* | 5/2008 | Heffington | .......... B60R 16/0231 340/438 |
| 2008/0027614 A1* | 1/2008 | Field | ..................... B60W 10/06 701/60 |
| 2009/0248233 A1* | 10/2009 | Yamada | .................. F16H 61/12 701/31.4 |
| 2010/0083936 A1* | 4/2010 | Verdejo | .................. B60K 6/485 123/406.65 |

FOREIGN PATENT DOCUMENTS

JP 3362637 B 1/2003

* cited by examiner

*Primary Examiner* — Justin Holmes
(74) *Attorney, Agent, or Firm* — McGinn IP Law Group, PLLC

(57) ABSTRACT

An abnormality detection device for a continuously variable transmission includes: a setting module that sets a target gear ratio based on an operation amount of an accelerator and a vehicle speed; an calculation module that determines an input torque to the continuously variable transmission from an output torque of an engine, obtains a generated driving force of a power unit including the engine and the continuously variable transmission according to the input torque and the target gear ratio, and calculates an acceleration of a vehicle based on the generated driving force of the power unit and a running resistance; and a determination module that determines the target gear ratio to be abnormal when the acceleration of the vehicle calculated by the calculation module is lower than or equal to a predetermined value.

14 Claims, 4 Drawing Sheets

ABNORMALITY DETECTION DEVICE FOR CONTINUOUSLY VARIABLE TRANSMISSION AND METHOD OF DETECTING ABNORMALITY OF THE CONTINUOUSLY VARIABLE TRANSMISSION

CROSS-REFERENCE TO RELATED APPLICATIONS

The present application claims priority from Japanese Patent Application No. 2014-010020 filed on Jan. 23, 2014, the entire contents of which are hereby incorporated by reference.

BACKGROUND

1. Technical Field

The present disclosure relates to an abnormality detection device for a continuously variable transmission and a method of detecting abnormality of the continuously variable transmission.

2. Related Art

These days, continuously variable transmissions (CVT), such as a chain-type CVT or a belt-type CVT, which allow a gear ratio to be continuously changed, are widely in practical use. In general, the continuously variable transmission is controlled by an electrical control device using a microcomputer, for example. Although it is extremely rare for such an electrical control device to have a failure, a fault might occur in the microcomputer, for example, a fault in a memory such as a RAM and a register (for example, written data and read data do not match), a fault in a logical operation circuit, and variation in clock signal might occur. In addition, an error in setting or writing ROM data (such as control data) might occur.

Japanese Patent No. 3362637 discloses a technology for a continuously variable transmission that determinants a gear ratio by performing transmission control using a line pressure as source pressure, which accurately determines a failure of a controller (electrical control unit) in the continuously variable transmission and which prevents a sudden deceleration due to a shift of the continuously variable transmission to the lowest speed gear ratio at the time of failure.

With this technology, a sub-controller first divides a primary pulley rotational speed by a secondary pulley rotational speed to determine an actual gear ratio, and retrieves a preset value of line pressure solenoid drive duty based on the actual gear ratio. It is to be noted that the preset value of line pressure solenoid drive duty is a solenoid drive duty which is defined for a gear ratio and corresponding to a maximum pressure of target line pressure value. Therefore, a range of duty exceeding the preset value of line pressure solenoid drive duty is a high line pressure range which is not achievable by nature in the transmission control with the gear ratio.

Next, the sub-controller reads a solenoid drive duty (control command value of line pressure) to a line pressure solenoid from a main controller, and determines whether the main controller is normal or abnormal according to whether or not the solenoid drive duty exceeds the preset value of line pressure solenoid drive duty. When the main controller is abnormal, the sub-controller sets a main controller abnormality determination signal to 0 and fixes the current gear ratio, whereas when the main controller is normal, the sub-controller sets the abnormality determination signal to 1 and performs normal transmission.

As mentioned above, the technology described in Japanese Patent No. 3362637 determines the main controller to be abnormal in the case where the solenoid drive duty (control command value of line pressure) to the line pressure solenoid exceeds the preset value of line pressure solenoid drive duty which is determined based on the actual gear ratio, that is, where the solenoid drive duty is in a high line pressure range which is not achievable in actual line pressure control.

However, even when the target gear ratio for a continuously variable transmission is in a range achievable in normal control and the solenoid drive duty (control command value of line pressure) is in a range of normal control, sudden deceleration may occur depending on a state of the vehicle, such as the output torque of the engine and a running resistance. That is, for example, when transmission is shifted down, acceleration or deceleration may occur depending on conditions such as the output torque of the engine and the running resistance.

However, the technology described in Japanese Patent No. 3362637 may not detect an abnormal state in which although a target gear ratio is in a range achievable in normal control, sudden deceleration occurs depending on conditions such as the output torque of the engine and the running resistance.

SUMMARY OF THE INVENTION

The present disclosure has been made to solve the above-mentioned problem and provides an abnormality detection device for a continuously variable transmission and a method of detecting abnormality of the continuously variable transmission, the abnormality detection device being capable of detecting whether or not a target gear ratio is an abnormal value which may cause a sudden deceleration higher than a predetermined deceleration even when the target gear ratio is in a range achievable in normal control.

An aspect of the present disclosure provides an abnormality detection device for a continuously variable transmission including: a setting module that sets a target gear ratio for the continuously variable transmission based on an operation amount of an accelerator and a vehicle speed; a calculation module that determines an input torque to the continuously variable transmission from an output torque of an engine, obtains a generated driving force of a power unit including the engine and the continuously variable transmission according to the input torque to the continuously variable transmission and the target gear ratio set by the setting module, and calculates an acceleration of a vehicle based on the generated driving force of the power unit and a running resistance; and a determination module that determines the target gear ratio to be abnormal in the case where the acceleration of the vehicle calculated by the calculation module is lower than or equal to a predetermined value.

Another aspect of the present disclosure provides an abnormality detection device for a continuously variable transmission including: a setting module that sets a target gear ratio for the continuously variable transmission based on an operation amount of an accelerator and a vehicle speed; a calculation module that determines a generated driving force for determination of a power unit including an engine and the continuously variable transmission based on a running resistance and a deceleration determination acceleration for determining whether or not a vehicle experiences a sudden deceleration higher than a predetermined deceleration, obtains an input torque to the continuously variable transmission from an output torque of the engine, and calculates a target gear ratio for determination based on the generated driving force for determination of the power unit and the input torque to the continuously variable transmission; and a determination module that determines the target gear ratio to be abnormal in the case where the target gear ratio set by the setting module is higher than or equal to the target gear ratio for determination calculated by the calculation module.

The determination module may determine whether or not a target gear ratio is abnormal when a vehicle is not braked.

The determination module may determine whether or not the target gear ratio is abnormal when the vehicle speed is higher than or equal to a predetermined speed.

The determination module may determine the target gear ratio to be abnormal in the case where a state, in which the target gear ratio is determined to be abnormal, continues for a predetermined time or longer.

The abnormality detection device for a continuously variable transmission according to the present disclosure may further include a control module that controls the continuously variable transmission so as to match an actual gear ratio of the continuously variable transmission to the target gear ratio, and the control unit prohibits the gear ratio of the continuously variable transmission from being shifted to a lower gear ratio in the case where the target gear ratio is determined to be abnormal by the determination module.

The calculation module may determine the running resistance according to a vehicle speed, and a vehicle speed used when the target gear ratio is set by the setting unit and a vehicle speed used when the running resistance is determined by the calculation module are respectively detected by different sensors.

Another aspect of the present disclosure provides a method of detecting abnormality of a continuously variable transmission including: setting a target gear ratio for the continuously variable transmission based on an operation amount of an accelerator and a vehicle speed; determining an input torque to the continuously variable transmission from an output torque of an engine, obtaining a generated driving force of a power unit including the engine and the continuously variable transmission according to the input torque to the continuously variable transmission and the target gear ratio set in the setting, and calculating an acceleration of a vehicle based on the generated driving force of the power unit and a running resistance; and determining the target gear ratio to be abnormal in the case where the acceleration of the vehicle calculated in the calculating is lower than or equal to a predetermined value.

Another aspect of the present disclosure provides a method of detecting abnormality of a continuously variable transmission according to the present disclosure including: setting a target gear ratio for the continuously variable transmission based on an operation amount of an accelerator and a vehicle speed; determining a generated driving force for determination of a power unit including an engine and the continuously variable transmission based on a running resistance and a deceleration determination acceleration for determining whether or not a vehicle experiences a sudden deceleration higher than a predetermined deceleration, obtaining an input torque to the continuously variable transmission from an output torque of the engine, and calculating a target gear ratio for determination based on the generated driving force for determination of the power unit and the input torque to the continuously variable transmission; and determining the target gear ratio to be abnormal in the case where the target gear ratio set in the setting is higher than or equal to the target gear ratio for determination calculated in the calculating.

DETAILED DESCRIPTION

Figure 1:
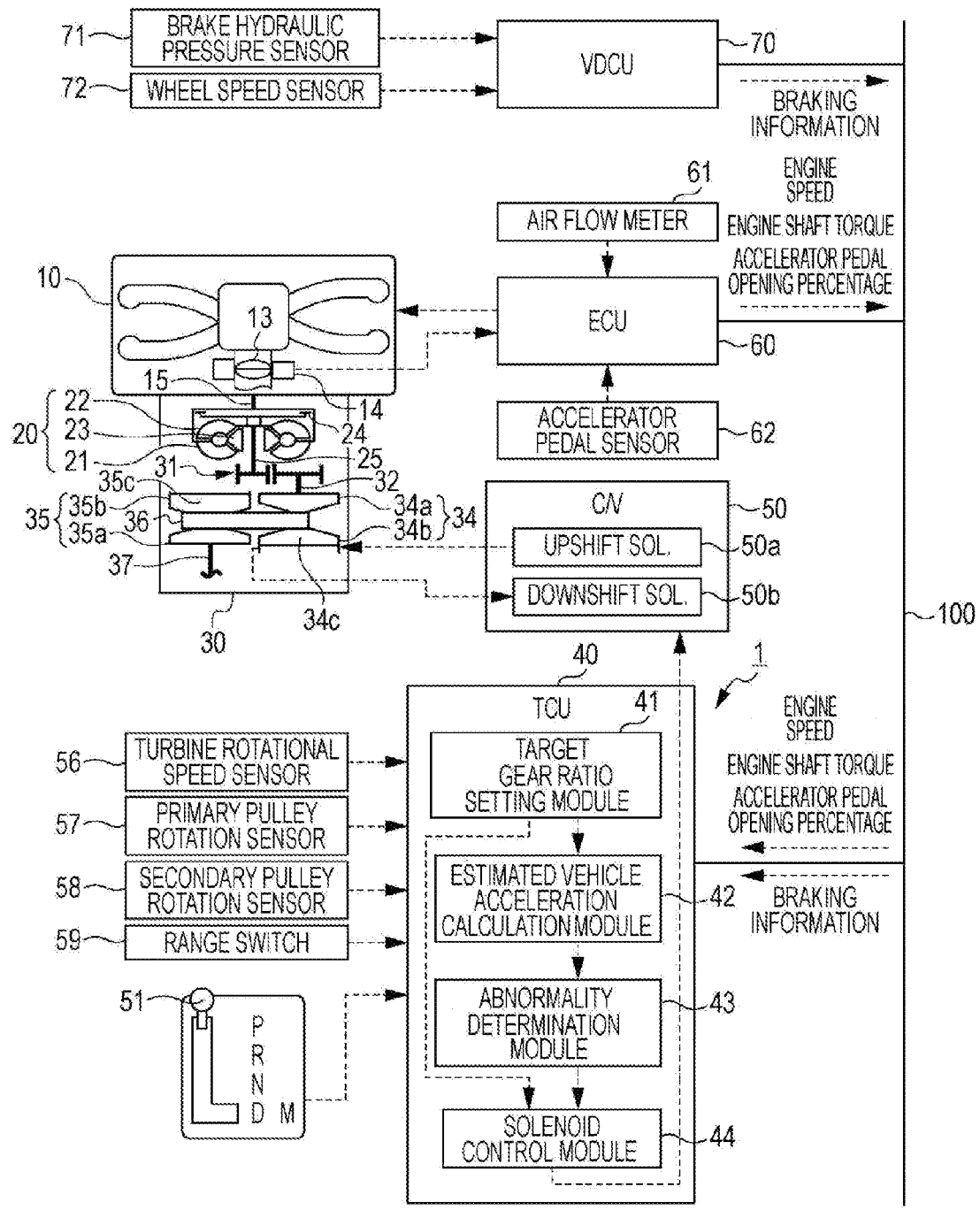
FIG. 1 is a block diagram illustrating the configuration of an abnormality detection device for a continuously variable transmission according to a first implementation.

Hereinafter, a preferred implementation of the present disclosure will be described in detail with reference to the accompanying drawings. It is to be noted that the same or corresponding components in the drawings will be denoted by the same symbol. Also, the same elements in the drawings are labeled with the same symbols and a redundant description will be omitted.

(First Implementation)

First, the configuration of an abnormality detection device 1 for a continuously variable transmission according to the first implementation will be described with reference to FIG. 1. FIG. 1 is a block diagram illustrating the configuration of the abnormality detection device 1 for a continuously variable transmission and a continuously variable transmission 30 to which the abnormality detection device 1 is applied.

An engine 10 may be of any type and the present implementation employs a horizontally-opposed four-cylinder direct-injection gasoline engine. In the engine 10, air sucked by an air cleaner (not illustrated) is throttled by an electronically controlled throttle valve (hereinafter referred to as a "throttle valve") 13 which is provided in an inlet pipe, and the air flows through an intake manifold and is sucked into each of the cylinders which are formed in the engine 10. Here, the amount of air sucked by the air cleaner is detected by an air flow meter 61. Furthermore, the throttle valve 13 is provided with a throttle opening sensor 14 that detects an opening of the throttle valve 13. An injector, which injects fuel, is mounted in each cylinder. In addition, a spark plug which ignites an air-fuel mixture, and an igniter built-in coil which applies a high voltage to the spark plug are mounted in each cylinder. In each cylinder of the engine 10, air-fuel mixture is ignited by the spark plug and burns, the air-fuel mixture including air sucked and fuel injected by the injector. The exhaust gas after combustion is discharged through an exhaust pipe.

In addition to the air flow meter 61 and the throttle opening sensor 14 described above, a cam angle sensor for identifying cylinders of the engine 10 is mounted in the vicinity of the camshaft of the engine 10. Furthermore, a crank angle sensor for detecting a position of a crankshaft is mounted in the vicinity of the crankshaft of the engine 10. These sensors are connected to the below-described engine control unit (hereinafter referred to as "ECU") 60. The ECU 60 is also connected to various sensors such as an accelerator pedal sensor 62 that detects a depressed amount of an accelerator pedal, that is, the opening of the accelerator pedal, and a coolant temperature sensor that detects a temperature of coolant for the engine 10.

The output shaft 15 of the engine 10 is connected to a continuously variable transmission 30 that converts and outputs a driving force from the engine 10 via a torque converter 20 that has a clutch function and a torque amplifying function.

The torque converter 20 mainly includes a pump impeller 21, a turbine liner 22, and a stator 23. The pump impeller 21 connected to the output shaft 15 generates a flow of oil, and the turbine liner 22, which is disposed to face the pump impeller 21, receives force from the engine 10 via oil to drive an output shaft. The stator 23 located between the pump impeller 21 and the turbine liner 22 rectifies the discharge (return) flow from the turbine liner 22 and returns the flow to the pump impeller 21, thereby generating a torque amplifying effect.

The torque converter 20 also has a lock-up clutch 24 that sets the input and output in a directly connected state. When the lock-up clutch 24 is not engaged (in a non-lock-up state), the torque converter 20 increases the torque of the drive force from the engine 10 and transmits the increased torque to the continuously variable transmission 30, whereas when the lock-up clutch 24 is engaged (in a lock-up state), the torque converter 20 directly transmits the drive force from the engine 10 to the continuously variable transmission 30. The rotational speed (turbine rotational speed) of the turbine liner 22 included in the torque converter 20 is detected by a turbine rotational speed sensor 56. The detected turbine rotational speed is outputted to a below-described transmission control unit (hereinafter referred to as a "TCU") 40.

The continuously variable transmission 30 has a primary shaft 32 and a secondary shaft 37 disposed parallel to the primary shaft 32, the primary shaft being connected to an output shaft 25 of the torque converter 20 via a reduction gear 31.

The primary shaft 32 is provided with a primary pulley 34. The primary pulley 34 has a fixed sheave 34a connected to the primary shaft 32, and a movable sheave 34b which faces the fixed sheave 34a and is attached slidably in the axial direction of the primary shaft 32. Each of the sheaves 34a and 34b is designed to have a variable cone surface pitch, that is, a variable pulley groove width. On the other hand, the secondary shaft 37 is provided with a secondary pulley 35. The secondary pulley 35 has a fixed sheave 35a connected to the secondary shaft 37, and a movable sheave 35b which faces the fixed sheave 35a and is attached slidably in the axial direction of the secondary shaft 37. The secondary pulley 35 is designed to have a variable pulley groove width.

A chain 36 for transmitting drive force is suspended between the primary pulley 34 and the secondary pulley 35. The groove width of each of the primary pulley 34 and the secondary pulley 35 is changed so that a ratio (pulley ratio) of a winding radius of the chain 36 to each pulley 34, 35 is changed, thereby changing the gear ratio continuously. Here, the gear ratio i is expressed by i=Rs/Rp, where Rp is the winding radius of the chain 36 to the primary pulley 34 and Rs is the winding radius of the chain 36 to the secondary pulley 35. Therefore, the gear ratio i is determined by dividing a primary pulley rotation speed Np by a secondary pulley rotational speed Ns (i=Np/Ns).

The primary pulley 34 (movable sheave 34b) includes a hydraulic chamber 34c. On the other hand, the secondary pulley 35 (movable sheave 35b) includes a hydraulic chamber 35c. The groove width of each of the primary pulley 34 and the secondary pulley 35 is set and changed by adjusting a primary hydraulic pressure and a secondary hydraulic pressure, the primary hydraulic pressure being introduced into the hydraulic chamber 34c of the primary pulley 34, the secondary hydraulic pressure being introduced into the hydraulic chamber 35c of the secondary pulley 35.

The hydraulic pressure for shifting the continuously variable transmission 30, that is, the above-mentioned primary hydraulic pressure and secondary hydraulic pressure are controlled by a valve body (control valve) 50. The valve body 50 uses a spool valve and a solenoid valve (electromagnetic valve) for actuating the spool valve to open and close an oil passage which is formed in the valve body 50, thereby adjusting the hydraulic pressure discharged from an oil pump and supplying the adjusted hydraulic pressure to the hydraulic pressure chamber 34c of the primary pulley 34 and the hydraulic pressure chamber 35c of the secondary pulley 35. In addition, the valve body 50 also supplies a hydraulic pressure, for example, to a forward/reverse switching mechanism for switching between forwarding and reversing the vehicle.

The transmission control of the continuously variable transmission 30 is performed by the TCU 40. That is, the TCU 40 controls the drive of the above-described valve body 50 including an upshift solenoid valve 50a and a downshift solenoid valve 50b, thereby adjusting the amount of automatic transmission fluid (ATF) supplied/discharged to or from the hydraulic pressure chamber 34c of the primary pulley 34 and changing the gear ratio of the continuously variable transmission 30. The details will be described later.

Here, the floor (center console) of the vehicle is provided with a shift lever (select lever) 51 to receive an operation by a driver for selectively switching between automatic transmission mode ("D" range) and manual transmission mode ("M" range). The shift lever 51 is provided with a range switch 59 which is connected thereto to operate in coordination with the shift lever 51 and which detects a selection position of the shift lever 51. The range switch 59 is connected to the TCU 40 and the detected selection position of the shift lever 51 is read into the TCU 40. It is to be noted that in addition to the "D" range and the "M" range, the shift lever 51 allows selectable switching between parking "P" range, reverse "R" range, and neutral "N" range. It is to be noted that the TCU 40 is also connected to a primary pulley rotation sensor 57 that detects a rotational speed of the primary pulley 34 and a secondary pulley rotation sensor 58 (corresponding to a vehicle speed sensor) that detects a rotational speed of the secondary pulley 35.

The TCU 40 is communicably connected to the ECU 60 and a vehicle dynamic control unit (hereinafter referred to as a "VDCU") 70 via, for example, a controller area network (CAN) 100, the ECU 60 for comprehensively controlling the engine 10.

The TCU 40, the ECU 60 and the VDCU 70 each include a microprocessor for performing calculation, a ROM for storing programs that cause the microprocessor to execute processing, a RAM for storing various data such as results of the calculation, a backup RAM for saving the stored content with a 12V battery, and an input and output I/F.

The ECU 60 identifies each cylinder based on the output of the above-described cam angle sensor, and determines an engine speed from a change in rotational position of the crankshaft, the rotational position being detected from the output of the crank angle sensor. Also, the ECU 60 obtains various pieces of information such as a suction air amount, an accelerator pedal opening, an air-fuel ratio of air-fuel mixture, and a coolant temperature based on detection signals inputted from the above-described various sensors. The ECU 60 then controls an amount of fuel injection, an ignition timing, and various devices such as the throttle valve 13 based on these obtained various pieces of information, thereby controlling the engine 10 comprehensively.

The ECU 60 calculates an engine shaft torque (output torque) of the engine 10 based on the suction air amount detected by the air flow meter 61. In addition, the ECU 60 transmits information to the TCU 40 via the CAN 100, the information including an engine speed, an engine shaft torque, and an accelerator pedal opening (or an accelerator pedal opening percentage, that is, the percentage of actual accelerator opening with respect to full opening).

The VDCU 70 is connected to a brake hydraulic pressure sensor 71 that detects a master cylinder pressure (brake hydraulic pressure) of a brake actuator (not illustrated). The VDCU 70 is also connected to a wheel speed sensor 72 (corresponding to a vehicle speed sensor) that detects a rotational speed (vehicle speed) of each wheel of the vehicle. The VDCU 70 drives a brake actuator to brake the vehicle according to an amount of operation of a brake pedal, detects a vehicle behavior by various sensors (for example, the wheel speed sensor 72, a steering angle sensor, an acceleration sensor, and a yaw rate sensor), and reduces skidding by brake control using automatic pressurization and torque control of the engine 10, thereby assuring the stability of the vehicle when the vehicle turns. In addition, the VDCU 70 transmits braking information (brake operation information) such as the detected brake hydraulic pressure and wheel speed (vehicle speed) to the TCU 40 via the CAN 100.

The TCU 40 continuously changes the gear ratio automatically according to an operational state (for example, the accelerator pedal opening and the vehicle speed) of the vehicle based on a transmission map. It is to be noted that a transmission map corresponding to the automatic transmission mode is stored in the ROM within the TCU 40.

In particular, the TCU 40 has a function of detecting abnormality (that is, determining reasonableness) of the target gear ratio for the continuously variable transmission 30. Thus, the TCU 40 functionally includes a target gear ratio setting module 41, an estimated vehicle acceleration calculation module 42, an abnormality determination unit 43, and a solenoid control module 44. In the TCU 40, programs stored in the ROM are executed by a microprocessor, thereby achieving each of the functions of the target gear ratio setting module 41, the estimated vehicle acceleration calculation module 42, the abnormality determination module 43, and the solenoid control module 44.

The target gear ratio setting module 41 sets a target gear ratio for the continuously variable transmission 30 based on an accelerator pedal opening (an operation amount of the accelerator) received from the ECU 60 via the CAN 100, and the vehicle speed detected by the secondary pulley rotation sensor 58. That is, the target gear ratio setting module 41 functions as the setting unit described in the appended claims. The target gear ratio set by the target gear ratio setting module 41 is outputted to the estimated vehicle acceleration calculation module 42 and the solenoid control module 44.

The estimated vehicle acceleration calculation module 42 calculates an input torque to the continuously variable transmission 30 based on the output torque of the engine 10 (engine shaft torque), obtains generated driving force of the power unit including the engine 10 and the continuously variable transmission 30 according to the input torque to the continuously variable transmission 30 and the target gear ratio set by the target gear ratio setting module 41, and calculates acceleration (estimated vehicle acceleration) of the vehicle based on the generated driving force of the power unit and the running resistance. That is, the estimated vehicle acceleration calculation module 42 functions as the calculation unit described in the appended claims.

More specifically, the estimated vehicle acceleration calculation module 42 calculates an estimated vehicle acceleration [m/s$^2$] based on Expression (1) below.

estimated vehicle acceleration=(power unit generated driving force−air resistance−rolling resistance) ÷vehicle weight  (1)

The power unit generated driving force is calculated based on Expression (1.1) below, the air resistance [N] is calculated based on Expression (1.2) below, and the rolling resistance [N] is calculated based on Expression (1.3) below. The design value of the vehicle weight [kg] is stored as data. It is to be noted that the air resistance and the rolling resistance each correspond to the running resistance described in the appended claims.

power unit generated driving force=primary pulley input torque×target gear ratio×final gear ratio× reduction gear ratio÷radius of tire  (1.1)

The primary pulley input torque [N·m] is calculated based on Expression (1.1.1) below. The design values of the final gear ratio, the reduction gear ratio, and the radius of tire are stored as data.

air resistance=(vehicle speed)$^2$×value of CD×air density×frontal projected area÷2  (1.2)

A value detected by the wheel speed sensor 72 is used as the vehicle speed [m/s]. The design values of CD and the frontal projected area [m$^2$] are stored as data. Also, the value of air density [kg/m$^3$] at a normal temperature (20° C.) is stored as data.

rolling resistance=rolling resistance coefficient×vehicle weight×gravitational acceleration [m/s$^2$]  (1.3)

For example, a typical fixed value may be stored as data of the rolling resistance or the value of rolling resistance may be selectively changed according to road surface conditions (for example, gravel road or snowy road conditions).

primary pulley input torque=(engine shaft torque− ATF pump torque)×torque converter torque ratio  (1.1.1)

The ATF pump torque [N·m] is calculated based on Expression (1.1.1.1) below, and the torque converter torque ratio is calculated based on Expression (1.1.1.2) below.

ATF pump torque=ATF pump torque map (engine speed, secondary pulley pressure)  (1.1.1.1)

The ATF pump torque map is a map that defines the relationship between the engine speed [rpm], the secondary pulley pressure, and the ATF pump torque.

torque converter torque ratio=torque converter torque ratio table (torque converter speed ratio)  (1.1.1.2)

The torque converter torque ratio table is a table that defines the relationship between the torque converter speed ratio and the torque converter torque ratio (torque amplification ratio). The torque converter speed ratio is calculated based on Expression (1.1.1.2.1) below.

torque converter speed ratio=turbine rotational speed÷engine speed  (1.1.1.2.1)

The estimated vehicle acceleration calculated by the estimated vehicle acceleration calculation module 42 in this manner is outputted to the abnormality determination module 43.

The abnormality determination module 43 determines the target gear ratio to be abnormal in the case where the estimated vehicle acceleration calculated by the estimated vehicle acceleration calculation module 42 is lower than or equal to a predetermined value (a predetermined deceleration, for example, −3 m/s²). That is, the abnormality determination module 43 functions as the determination unit described in the appended claims.

The abnormality determination module 43 determines whether or not the target gear ratio is abnormal based on braking information (brake operation information) received from the VDCU 70 via the CAN 100 when the vehicle is not braked (the brake pedal is not depressed) and the vehicle speed is higher than or equal to a predetermined speed (for example, 20 km/h). The abnormality determination module 43 also determines the target gear ratio to be abnormal in the case where a state, in which the target gear ratio is determined to be abnormal, continues for a predetermined time (for example, 500 msec) or longer. A result of the determination made by the abnormality determination module 43 is outputted to the solenoid control module 44.

In regular state (normal state), the solenoid control module 44 controls the gear ratio according to a target gear ratio. That is, the solenoid control module 44 controls the drive of the upshift solenoid valve 50a and the downshift solenoid valve 50b so as to match the actual gear ratio to the target gear ratio. More particularly, at the upshift, the solenoid control module 44 generates a drive duty according to the target gear ratio, opens the upshift solenoid valve 50a, and closes the downshift solenoid valve 50b, thereby supplying ATF to the hydraulic pressure chamber 34c of the primary pulley 34 to change the gear ratio to an overdrive gear ratio. Conversely, at the downshift, the solenoid control module 44 generates a drive duty according to the target gear ratio, opens the downshift solenoid valve 50b, and closes the upshift solenoid valve 50a, thereby discharging ATF from the hydraulic pressure chamber 34c of the primary pulley 34 to change the gear ratio to a lower gear ratio.

On the other hand, in the case where the target gear ratio is determined to be abnormal by the abnormality determination module 43, the solenoid control module 44 discontinues transmission control based on the target gear ratio and fixes the gear ratio. That is, the drive duty of each of the upshift solenoid valve 50a and the downshift solenoid valve 50b is set to 0%, and the upshift solenoid valve 50a and the downshift solenoid valve 50b are closed to fix the gear ratio. That is, the solenoid control module 44 functions as the control unit described in the appended claims.

Figure 2:
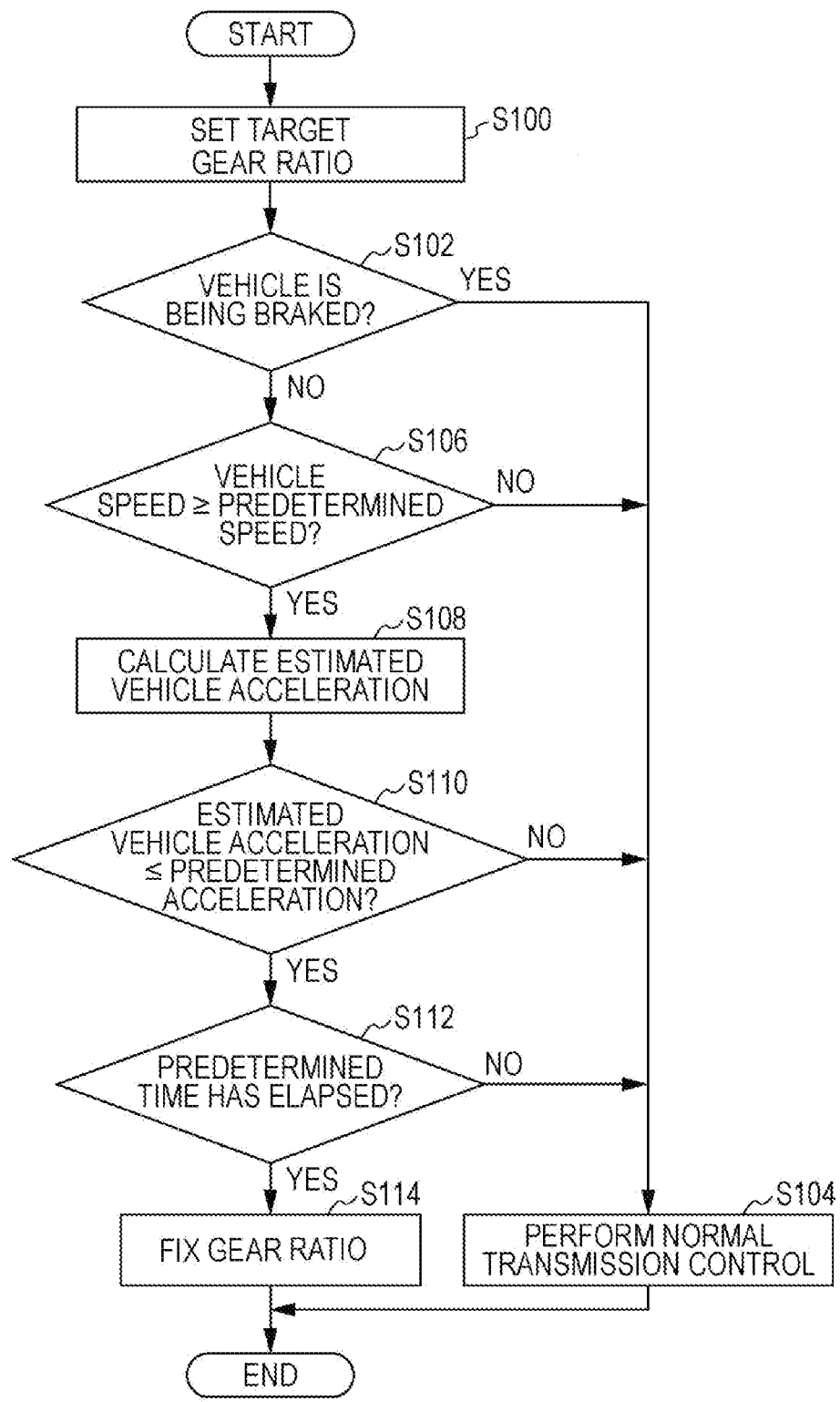
FIG. 2 is a flow chart illustrating the steps of abnormality detection processing performed on a target gear ratio by the abnormality detection device for a continuously variable transmission according to the first implementation.

Next, the operation of the abnormality detection device 1 for a continuously variable transmission will be described with reference to FIG. 2. FIG. 2 is a flow chart illustrating the steps of abnormality detection (reasonableness determination) processing performed on a target gear ratio by the abnormality detection device 1 for a continuously variable transmission. The processing is repeatedly performed by the TCU 40 for every predetermined time (for example, every 10 ms).

First, in step S100, a target gear ratio for the continuously variable transmission 30 is set based on the accelerator pedal opening received from the ECU 60 via the CAN 100 and the vehicle speed detected by the secondary pulley rotation sensor 58. Next, in step S102, it is determined whether or not the vehicle is being braked (whether or not the brake pedal has been depressed) based on the braking information (brake operation information) received from the VDCU 70 via the CAN 100. When the vehicle is not being braked, the processing flow proceeds to step S106. On the other hand, when the vehicle is being braked, normal transmission control is performed in step S104, that is, the gear ratio is controlled according to the target gear ratio. That is, the drive of the upshift solenoid valve 50a and the downshift solenoid valve 50b is controlled so as to match the actual gear ratio to the target gear ratio. Subsequently, the flow is exited.

In step S106, it is determined whether or not the vehicle speed is higher than or equal to a predetermined speed (for example, 20 km/h). When the vehicle speed is higher than or equal to the predetermined speed, the processing flow proceeds to step S108. On the other hand, when the vehicle speed is lower than the predetermined speed, normal transmission control is performed in step S104, that is, the gear ratio is controlled according to the target gear ratio. Subsequently, the flow is exited.

In step S108, the input torque to the continuously variable transmission 30 is calculated based on the output torque of the engine 10, the generated driving force of the power unit is obtained according to the input torque to the continuously variable transmission 30 and the target gear ratio set in step S100, and the acceleration (estimated vehicle acceleration) of the vehicle is calculated based on the generated driving force of the power unit and the running resistance. The method of calculating (the method of estimating) an estimated vehicle acceleration is as described above, and thus detailed description will be omitted herein.

Subsequently, in step S110, it is determined whether or not the estimated vehicle acceleration calculated in step S108 is lower than or equal to a predetermined acceleration (for example, −3 m/s²). When the estimated vehicle acceleration is lower than or equal to the predetermined acceleration, the processing flow proceeds to step S112. On the other hand, when the estimated vehicle acceleration is higher than the predetermined acceleration, normal transmission control is performed in step S104, that is, the gear ratio is controlled according to the target gear ratio. Subsequently, the flow is exited.

In step S112, it is determined whether or not a state, in which the estimated vehicle acceleration is lower than or equal to the predetermined acceleration (that is, abnormal state), has continued for a predetermined time (for example, 500 msec) or longer. When an abnormal state has continued for longer than the predetermined time (that is, the current state is determined to be abnormal), the processing flow proceeds to step S114. On the other hand, when an abnormal state has not continued for longer than the predetermined time, normal transmission control is performed in step S104, that is, the gear ratio is changed according to the target gear ratio. Subsequently, the flow is exited.

In step S114, transmission control based on the target gear ratio is discontinued and the gear ratio is fixed. That is, the drive duty of each of the upshift solenoid valve 50a and the downshift solenoid valve 50b is set to 0%, and the upshift solenoid valve 50a and the downshift solenoid valve 50b are closed, thereby preventing the transmission from shifting to a gear ratio which may cause a sudden deceleration.

As described above in detail, according to the present implementation, the acceleration of the vehicle is estimated based on the output torque of the engine 10, the target gear ratio for the continuously variable transmission 30, and the running resistance. When the estimated vehicle acceleration is lower than or equal to a predetermined deceleration (for example, −3 m/s²), the target gear ratio is determined to be abnormal. Thus, even when the target gear ratio is in a range achievable in normal control, it is possible to detect (that is, to determine the reasonableness of the target gear ratio) whether or not the target gear ratio is an abnormal value which may cause a sudden deceleration higher than a predetermined deceleration.

According to the present implementation, determining whether or not the target gear ratio is abnormal (value which may cause a sudden deceleration not intended by a driver) when a vehicle is not braked makes it possible to determine with high accuracy whether or not the target gear ratio is abnormal when the determination is necessary.

According to the present implementation, when the vehicle speed is higher than or equal to a predetermined speed (for example, 20 km/h), it is determined whether or not the target gear ratio is abnormal. Thus, for example when the target gear ratio becomes abnormal and the vehicle thereby experiences deceleration which is not intended by a driver and has a speed higher than a potentially dangerous speed, abnormality determination is performed.

According to the present implementation, the target gear ratio is determined to be abnormal in the case where a state in which, the target gear ratio is determined to be abnormal, has continued for a predetermined time (for example, 500 msec) or longer. Thus, an erroneous determination may be properly prevented.

According to the present implementation, in the case where the target gear ratio is determined to be abnormal, the drive of the upshift solenoid valve 50a and the downshift solenoid valve 50b is stopped, and the gear ratio of the continuously variable transmission 30 is fixed. Thus, shifting to a gear ratio which may cause, for example, deceleration not intended by a driver may be prevented.

According to the present implementation, a vehicle speed for setting the target gear ratio and a vehicle speed for determining the running resistance (air resistance) which is used for calculating a determination value are independently detected. Specifically, for example, a target gear ratio is calculated using vehicle speed data detected by the secondary pulley rotation sensor 58, and a running resistance (air resistance) is calculated using vehicle speed data detected by the wheel speed sensor 72. That is, a target gear ratio and a determination value for detecting abnormality of the target gear ratio are calculated from independent pieces of vehicle speed data. Therefore, abnormality (reasonableness) of a target gear ratio may be determined more accurately even in the case where a vehicle speed for calculating the target gear ratio is failed to be detected.

(Second Implementation)

In the above-described first implementation, in the case where a vehicle acceleration (estimated vehicle acceleration) is lower than or equal to a predetermined deceleration, the target gear ratio is determined to be abnormal, the vehicle acceleration being estimated based on the output torque of the engine 10, the target gear ratio for the continuously variable transmission 30, and the running resistance. Instead of the determination method described above, a configuration may be adopted in which a target gear ratio (that is, a target gear ratio for determination) is calculated based on the running resistance and the output torque of the engine 10, and the target gear ratio is compared with the target gear ratio for determination, thereby detecting abnormality (that is, determining reasonableness) of the target gear ratio, the target gear ratio causing a deceleration determination acceleration for determining whether or not a vehicle experiences a sudden deceleration higher than a predetermined deceleration.

Figure 3:
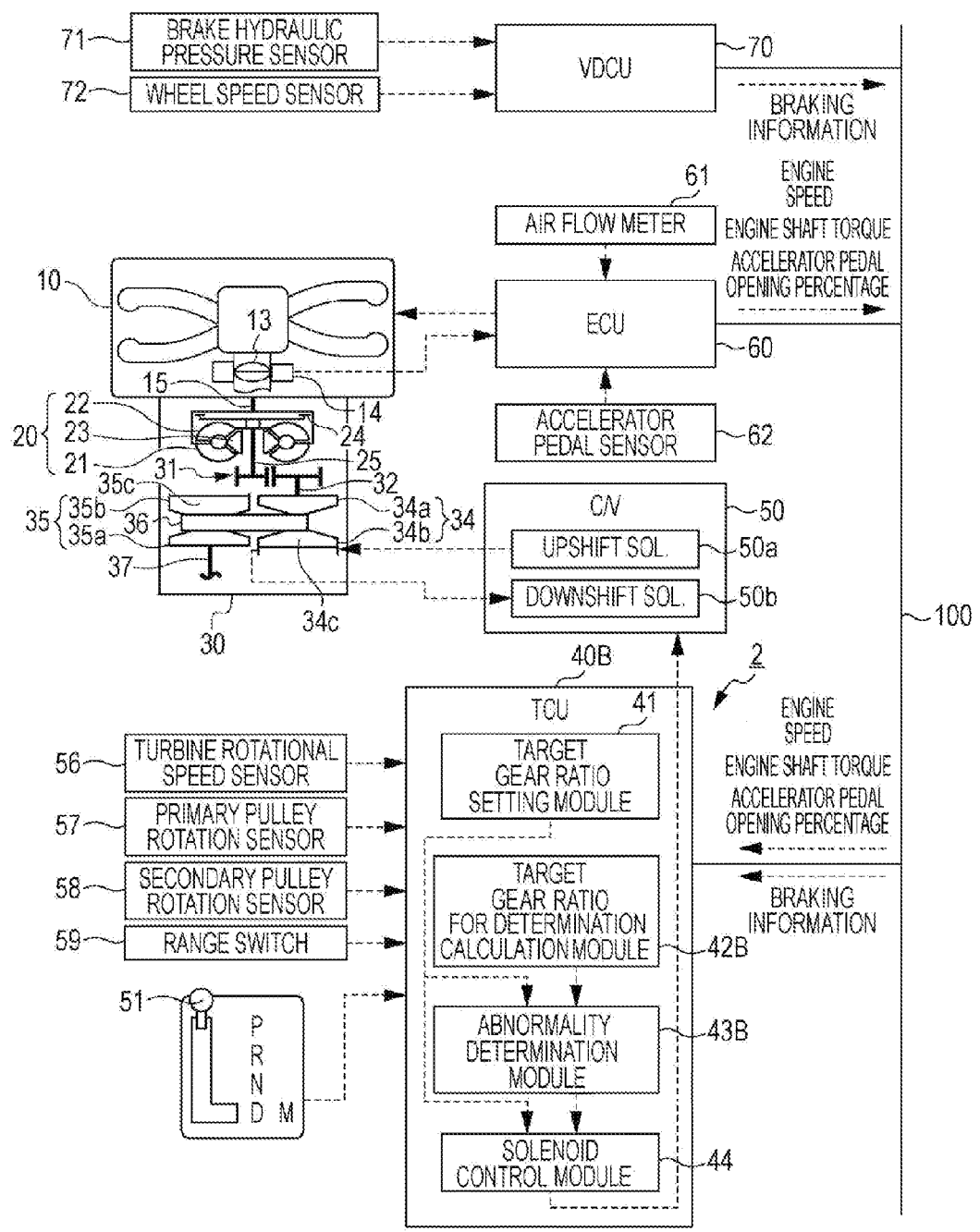
FIG. 3 is a block diagram illustrating the configuration of an abnormality detection device for a continuously variable transmission according to a second implementation.

Next, the configuration of an abnormality detection device 2 for a continuously variable transmission according to a second implementation will be described with reference to FIG. 3. FIG. 3 is a block diagram illustrating the configuration of the abnormality detection device 2 for a continuously variable transmission and the continuously variable transmission 30 to which the abnormality detection device 2 is applied. It is to be noted that in FIG. 3, the same or similar components as or to those of the first implementation are denoted by the same symbol.

The present implementation differs from the above-described first implementation in that TCU 40B is used instead of the TCU 40. The TCU 40B differs from the TCU 40 of the above-described first implementation in that the TCU 40B has a target gear ratio for determination calculation module 42B instead of the estimated vehicle acceleration calculation module 42, and an abnormality determination module 43B instead of the abnormality determination module 43. Other components are the same as or similar to those of the first implementation described above, and thus detailed description will be omitted herein.

The target gear ratio for determination calculation module 42B calculates a generated driving force for determination of the power unit including the engine 10 and the continuously variable transmission 30 based on a deceleration determination acceleration (for example, −3 m/s²) and the running resistance, obtains an input torque to the continuously variable transmission 30 from the output torque of the engine 10, and calculates a target gear ratio for determination based on the generated driving force for determination of the power unit and the input torque to the continuously variable transmission 30, the deceleration determination acceleration for determining whether or not the vehicle experiences a sudden deceleration higher than a predetermined deceleration. That is, the target gear ratio for determination calculation module 42B functions as the calculation unit described in the appended claims.

More specifically, the target gear ratio for determination calculation module 42B calculates a target gear ratio for determination based on Expression (2) below.

target gear ratio for determination=power unit generated driving force for determination÷primary pulley input torque÷final gear ratio÷reduction gear ratio×radius of tire (2)

The power unit generated driving force [N] is calculated based on Expression (2.1) below. The primary pulley input torque is calculated based on Expression (1.1.1) above. The design values of the final gear ratio, the reduction gear ratio, and the radius of tire are stored as data.

power unit generated driving force for determination=deceleration determination acceleration×vehicle weight+air resistance+rolling resistance (2.1)

The deceleration determination acceleration is set to, for example, "−3 [m/s²]". The design value of vehicle weight [kg] is stored as data. The air resistance is calculated based on Expression (1.2) above, and the rolling resistance is calculated based on Expression (1.3) above. The air resistance and rolling resistance each correspond to the running resistance described in the appended claims. The target gear ratio for determination calculated in this manner by the target gear ratio for determination calculation module 42B is outputted to the abnormality determination module 43B.

The abnormality determination module 43B determines the target gear ratio to be abnormal in the case where the target gear ratio set by the target gear ratio setting module 41 is higher than or equal to the target gear ratio for determination calculated by the target gear ratio for determination calculation module 42B. That is, the abnormality determination module 43B functions as the determination unit described in the appended claims. As described above, the abnormality determination module 43B determines whether or not the target gear ratio is abnormal when the vehicle is not braked (the brake pedal is not depressed) and the vehicle speed is higher than or equal to the predetermined speed (for example, 20 km/h). The abnormality determination module 43B also determines the target gear ratio to be abnormal in the case where a state, in which the target gear ratio is determined to be abnormal, continues for a predetermined time (for example, 500 msec) or longer. A result of the determination made by the abnormality determination module 43B is outputted to the solenoid control module 44. The solenoid control module 44 is the same as that of the first implementation described above, and thus detailed description will be omitted herein.

Figure 4:
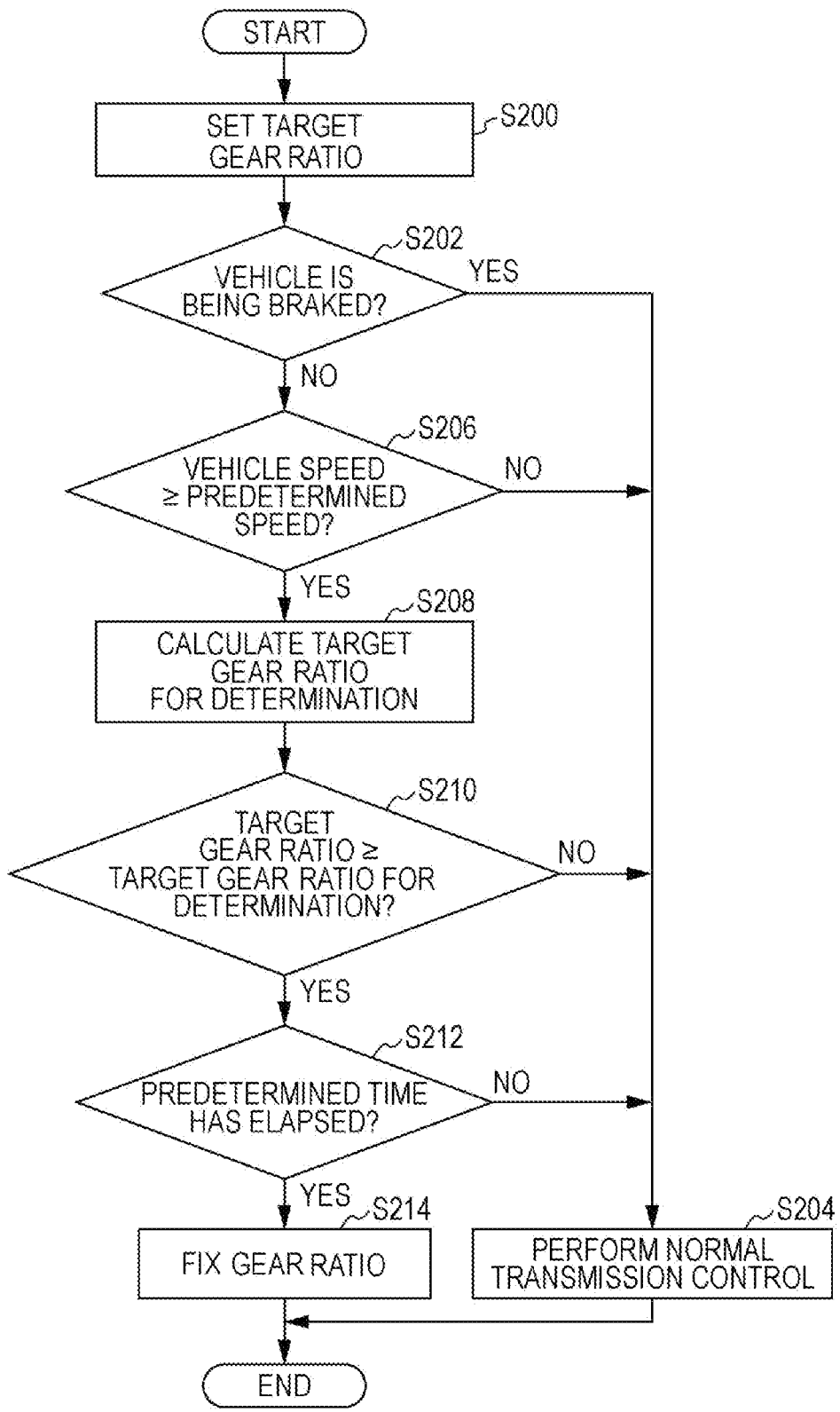
FIG. 4 is a flow chart illustrating the steps of abnormality detection processing performed on a target gear ratio by the abnormality detection device for a continuously variable transmission according to the second implementation.

Next, the operation of the abnormality detection device 2 for a continuously variable transmission will be described with reference to FIG. 4. FIG. 4 is a flow chart illustrating the steps of abnormality detection (reasonableness determination) processing performed on a target gear ratio by the abnormality detection device 2 for a continuously variable transmission. The processing is repeatedly performed by the TCU 40B for every predetermined time (for example, every 10 ms).

First, in step S200, a target gear ratio for the continuously variable transmission 30 is set based on the accelerator pedal opening and the vehicle speed. Next, in step S202, it is determined whether or not the vehicle is being braked (whether or not the brake pedal has been depressed). When the vehicle is not being braked, the processing flow proceeds to step S206. On the other hand, when the vehicle is being braked, normal transmission control is performed in step S204, that is, the gear ratio is controlled according to the target gear ratio. That is, the drive of the upshift solenoid valve 50a and the downshift solenoid valve 50b is controlled so as to match the actual gear ratio to the target gear ratio. Subsequently, the flow is exited.

In step S206, it is determined whether or not the vehicle speed is higher than or equal to a predetermined speed (for example, 20 km/h). When the vehicle speed is higher than or equal to the predetermined speed, the processing flow proceeds to step S208. On the other hand, when the vehicle speed is lower than the predetermined speed, normal transmission control is performed in step S204, that is, the gear ratio is controlled according to the target gear ratio. Subsequently, the flow is exited.

In step S208, a generated driving force for determination of the power unit is calculated based on a deceleration determination acceleration (for example, −3 m/s$^2$) and the running resistance, an input torque to the continuously variable transmission 30 is obtained from the output torque of the engine 10, and a target gear ratio for determination is calculated based on the generated driving force for determination of the power unit and the input torque to the continuously variable transmission 30, the deceleration determination acceleration for determining whether or not the vehicle experiences a sudden deceleration higher than a predetermined deceleration. The method of calculating a target gear ratio for determination is as described above, and thus detailed description will be omitted herein.

Subsequently, in step 210, it is determined whether or not the target gear ratio set in step S200 is higher than or equal to the target gear ratio for determination calculated in step 208. When the target gear ratio is higher than or equal to the target gear ratio for determination, the processing flow proceeds to step S212. On the other hand, when the target gear ratio is lower than the target gear ratio for determination, normal transmission control is performed in step S204, that is, the gear ratio is controlled according to the target gear ratio. Subsequently, the flow is exited.

In step S212, it is determined whether or not a state, in which the target gear ratio is higher than or equal to target gear ratio for determination (that is, abnormal state), has continued for a predetermined time (for example, 500 msec) or longer. When an abnormal state has continued for the predetermined time or longer (that is, the current state is determined to be abnormal), the processing flow proceeds to step S214. On the other hand, when an abnormal state has not continued for the predetermined time or longer, normal transmission control is performed in step S204, that is, the gear ratio is changed according to the target gear ratio. Subsequently, the flow is exited.

In step S214, transmission control based on the target gear ratio is discontinued and the gear ratio is fixed. That is, the drive duty of each of the upshift solenoid valve 50a and the downshift solenoid valve 50b is set to 0%, and the upshift solenoid valve 50a and the downshift solenoid valve 50b are closed, thereby preventing the transmission from shifting to a gear ratio which may cause a sudden deceleration.

According to the present implementation, a target gear ratio is calculated based on the running resistance and the output torque of the engine 10, the target gear ratio causing a deceleration determination acceleration (for example, −3 m/s$^2$) for determining whether or not the vehicle experiences a sudden deceleration higher than a predetermined deceleration. In the case where the target gear ratio is higher than or equal to the target gear ratio for determination, the target gear ratio is determined to be abnormal. Thus, even when the target gear ratio is in a range achievable in normal control, it is possible to detect (that is, to determine the reasonableness of the target gear ratio) whether or not the target gear ratio is an abnormal value which may cause a sudden deceleration higher than a predetermined deceleration.

Although the implementation of the present disclosure has been described above, the present disclosure is not limited to the above-described implementation and various modifications are possible. For example, in the above-described implementation, the present disclosure has been applied to a chain-type continuously variable transmission (CVT). Alternatively, the present disclosure may be applied to, for example, a belt-type CVT or a toroidal-type CVT.

The above-described implementation adopts a configuration in which whether or not braking is applied (whether or not brake operation is performed) is detected based on the value of brake hydraulic pressure received from the VDCU 70 via the CAN 100. Alternatively, instead of or in addition to using the brake hydraulic pressure mentioned above, whether or not brake operation is performed (whether or not braking is applied) may be detected by reading, for example, a signal of a brake switch which is turned on when the brake pedal is depressed.

In the above implementation, the ECU 60 that controls the engine 10 and the TCU 40 that controls the continuously variable transmission 30 are each implemented by an individual hardware in the above implementation. Alternatively, the ECU 60 and the TCU 40 may be integrally implemented.

The above-described implementation adopts a configuration in which the target gear ratio setting module 41, the estimated vehicle acceleration calculation module 42 (or the target gear ratio for determination calculation module 42B), and the abnormality determination module 43 (43B) are implemented on the same CPU, and the upshift solenoid valve 50a and the downshift solenoid valve 50b are internally closed in a software-controlled manner at the time of abnormality. Alternatively, the implementation may adopt a configuration in which the estimated vehicle acceleration calculation module 42 (or the target gear ratio for determination calculation module 42B) and the abnormality determination module 43 (43B) are implemented on a CPU or a supervisory IC which is different from that of the target gear ratio setting module 41 for example, and the upshift solenoid valve 50a and the downshift solenoid valve 50b are externally closed (a driver is stopped) in a hardware-controlled manner at the time of abnormality.

The above-described implementation adopts a configuration in which the spool valve is driven by the solenoid valve. Alternatively, the implementation may adopt a configuration in which the spool valve is driven by a stepping motor instead of the solenoid valve.

The above-described implementation adopts a configuration in which the gear ratio of the continuously variable transmission 30 is fixed in the case where the target gear ratio is determined to be abnormal. Alternatively, the implementation may adopt a configuration in which instead of fixing the gear ratio, the transmission is upshifted because it is sufficient to prohibit the transmission from being shifted (downshifted) to a gear ratio which causes deceleration of the vehicle.

The invention claimed is:

1. An abnormality detection device for a continuously variable transmission, the abnormality detection device comprising:
   a setting module that sets a target gear ratio for the continuously variable transmission based on an operation amount of an accelerator and a vehicle speed;
   a calculation module that determines an input torque to the continuously variable transmission from an output torque of an engine, obtains a generated driving force of a power unit including the engine and the continuously variable transmission according to the input torque to the continuously variable transmission and the target gear ratio set by the setting module, and calculates an acceleration of a vehicle based on the generated driving force of the power unit and a running resistance; and
   a determination module that determines the target gear ratio to be abnormal in the case where the acceleration of the vehicle calculated by the calculation module is lower than or equal to a predetermined value.

2. An abnormality detection device for a continuously variable transmission, the abnormality detection device comprising:
   a setting module that sets a target gear ratio for the continuously variable transmission based on an operation amount of an accelerator and a vehicle speed;
   a calculation module that determines a generated driving force for determination of a power unit including an engine and the continuously variable transmission based on a running resistance and a deceleration determination acceleration for determining whether or not a vehicle experiences a sudden deceleration higher than a predetermined deceleration, obtains an input torque to the continuously variable transmission from an output torque of the engine, and calculates a target gear ratio for determination based on the generated driving force for determination of the power unit and the input torque to the continuously variable transmission; and
   a determination module that determines the target gear ratio to be abnormal in the case where the target gear ratio set by the setting module is higher than or equal to the target gear ratio for determination calculated by the calculation module.

3. The abnormality detection device for a continuously variable transmission according to claim 1, wherein the determination module determines whether or not the target gear ratio is abnormal when the vehicle is not being braked.

4. The abnormality detection device for a continuously variable transmission according to claim 2, wherein the determination module determines whether or not the target gear ratio is abnormal when the vehicle is not being braked.

5. The abnormality detection device for a continuously variable transmission according to claim 1, wherein the determination module determines whether or not the target gear ratio is abnormal when the vehicle speed is higher than or equal to a predetermined speed.

6. The abnormality detection device for a continuously variable transmission according to claim 2, wherein the determination module determines whether or not the target gear ratio is abnormal when the vehicle speed is higher than or equal to a predetermined speed.

7. The abnormality detection device for a continuously variable transmission according to claim 1,
   wherein the determination module determines the target gear ratio to be abnormal in the case where a state, in which the target gear ratio is determined to be abnormal, continues for a predetermined time or longer.

8. The abnormality detection device for a continuously variable transmission according to claim 2,
   wherein the determination module determines the target gear ratio to be abnormal in the case where a state, in which the target gear ratio is determined to be abnormal, continues for a predetermined time or longer.

9. The abnormality detection device for a continuously variable transmission according to claim 7, further comprising:
   a control module that controls the continuously variable transmission so as to match an actual gear ratio of the continuously variable transmission to the target gear ratio,
   wherein the control module prohibits the gear ratio of the continuously variable transmission from being shifted to a lower gear ratio in the case where the target gear ratio is determined to be abnormal by the determination module.

10. The abnormality detection device for a continuously variable transmission according to claim 8, further comprising:
    a control module that controls the continuously variable transmission so as to match an actual gear ratio of the continuously variable transmission to the target gear ratio,
    wherein the control module prohibits the gear ratio of the continuously variable transmission from being shifted to a lower gear ratio in the case where the target gear ratio is determined to be abnormal by the determination module.

11. The abnormality detection device for a continuously variable transmission claim 1, wherein
    the calculation module determines the running resistance according to a vehicle speed, and a vehicle speed used when the target gear ratio is set by the setting module and a vehicle speed used when the running resistance is determined by the calculation module are respectively detected by different sensors.

12. The abnormality detection device for a continuously variable transmission claim 2, wherein
the calculation module determines the running resistance according to a vehicle speed, and
a vehicle speed used when the target gear ratio is set by the setting module and a vehicle speed used when the running resistance is determined by the calculation module are respectively detected by different sensors.

13. A method of detecting abnormality of a continuously variable transmission, the method comprising:
setting a target gear ratio for the continuously variable transmission based on an operation amount of an accelerator and a vehicle speed;
determining an input torque to the continuously variable transmission from an output torque of an engine, obtaining a generated driving force of a power unit including the engine and the continuously variable transmission according to the input torque to the continuously variable transmission and the target gear ratio set in the setting, and calculating an acceleration of a vehicle based on the generated driving force of the power unit and a running resistance; and
determining the target gear ratio to be abnormal in the case where the acceleration of the vehicle calculated in the calculating is lower than or equal to a predetermined value.

14. A method of detecting abnormality of a continuously variable transmission, the method comprising:
setting a target gear ratio for the continuously variable transmission based on an operation amount of an accelerator and a vehicle speed;
determining a generated driving force for determination of a power unit including an engine and the continuously variable transmission based on a running resistance and a deceleration determination acceleration for determining whether or not a vehicle experiences a sudden deceleration higher than a predetermined deceleration, obtaining an input torque to the continuously variable transmission from an output torque of the engine, and calculating a target gear ratio for determination based on the generated driving force for determination of the power unit and the input torque to the continuously variable transmission; and
determining the target gear ratio to be abnormal in the case where the target gear ratio set in the setting is higher than or equal to the target gear ratio for determination calculated in the calculating.

* * * * *